July 2, 1968

G. A. HUGHES ET AL 3,391,165

SYNTHESIS OF GON-5(10)-ENES

Filed April 7, 1966

INVENTORS
GORDON A. HUGHES
HERCHEL SMITH
BY Vito Victor Bellino
ATTORNEY

July 2, 1968 G. A. HUGHES ET AL 3,391,165
SYNTHESIS OF GON-5(10)-ENES
Filed April 7, 1966 2 Sheets-Sheet 2

INVENTORS
GORDON A. HUGHES
HERCHEL SMITH
BY J. V. Beelens
ATTORNEY

United States Patent Office 3,391,165
Patented July 2, 1968

3,391,165
SYNTHESIS OF GON-5(10)-ENES
Gordon Alan Hughes, Haverford, Pa., and Herchel Smith,
500 Chestnut Lane, Wayne, Pa. 19087; said Hughes
assignor to said Smith
Continuation-in-part of application Ser. No. 228,384,
Oct. 4, 1962. This application Apr. 7, 1966, Ser.
No. 540,930
11 Claims. (Cl. 260—397.3)

ABSTRACT OF THE DISCLOSURE

The preparation of novel 13-polycarbon-alkylgon-5(10)-enes by hydrolysis of the corresponding 3-alkoxygona-2,5(10)-diene is described. These compounds have estrogenic and progestational activity, and, in addition, are useful as intermediates for the preparation of compounds having progestational, anabolic, and androgenic activities.

---

This application is a continuation-in-part of co-pending application Ser. No. 228,348, filed Oct. 4, 1962; which in turn is a continuation of applications Ser. No. 57,904, filed Sept. 23, 1960; Ser. No. 91,341, filed Feb. 24, 1961; Ser. No. 137,535, filed Sept. 12, 1961; Ser. No. 195,000, filed May 15, 1962; and Ser. No. 196,557, filed May 16, 1962; all abandoned.

This invention relates to compositions of matter classified in the art of chemistry as substituted unsaturated gonane derivatives, and processes for making and using such compositions.

In describing the invention, reference will be made in the following specification to the annexed drawings, wherein.

Figure 1:
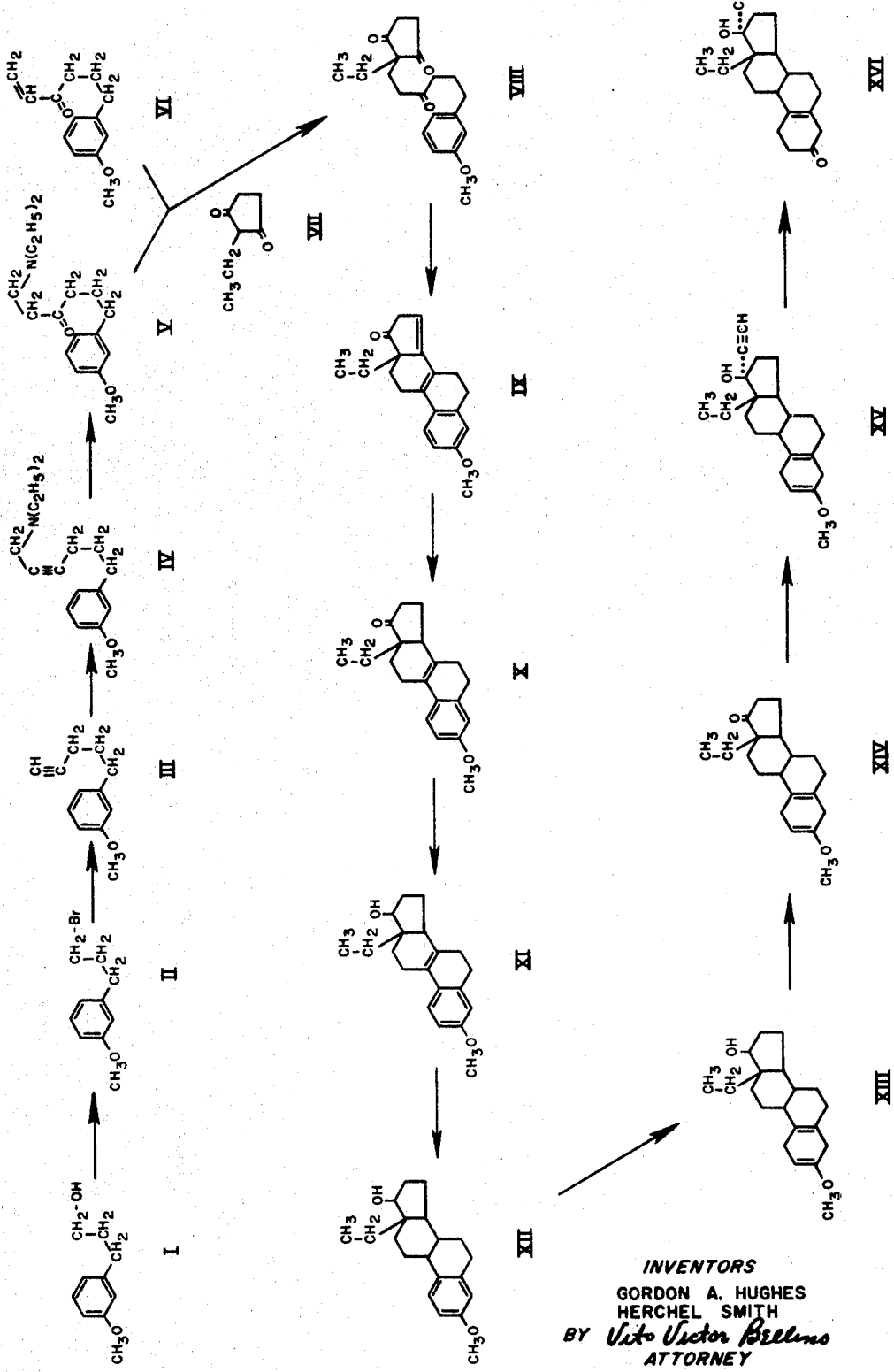
FIGURE 1 illustrates schematically the reaction sequence for preparing a 13-alkylgon-5(10)-ene, specifically 13β-ethyl-17α-ethynyl-17β-hydroxygon-5(10)-en-3-one.

The invention sought to be patented in a principal composition aspect is described as residing in the concept of a gon-5(10)-ene nucleus having attached thereto in the 13-position a monovalent polycarbonalkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent use characteristics of exerting qualitatively varying hormonal effects in animals as evidenced by pharmacological evaluation according to standard test procedures. Such tangible embodiments show androgenic, anti-estrogenic, progestational, blood-lipid effects, and anabolic actions, salt retention, salt excretion and central nervous system effects. This finding indicates their usefulness in the treatment of amenorrhea, dysmenorrhea, ovulation block and contraception, functional uterine bleeding, arteriosclerosis, hormone dependent tumors, infertility, pregnancy maintenance, habitual abortion, weight gain and nitrogen retention, growth stimulation, post operative recovery, healing of wounds, and healing of burns. In particular, it has been established that alterations of the natural steroid structure made possible by our discovery result not merely in a change of degree of hormonal activity, but, as a result of the separation of types of hormonal activity, alter in an unexpected way its basic nature so that a desirable hormone effect is maximized and an undesirable hormone effect is minimized. Furthermore, said tangible embodiments possess the use characteristic of being intermediates for the preparation of compositions exerting hormonal effects as evidenced by standard test procedures.

The invention sought to be patented in a subgeneric composition aspect is described as residing in the concept of a 13-alkyl-17-alkynyl-17-hydroxygon-5(10)-en-3-one (FIGURE 1, XVI), of which a specific embodiment, 13β-ethyl-17α-ethynyl-17-hydroxygon-5(10)-en-3-one, is hereinafter described.

The tangible embodiments of said subgeneric composition aspect possess the use characteristic of varying hormone effects in animals as evidenced by pharmacological evaluation by standard test procedures.

The invention sought to be patented, in a principal process of making the compositions aspect, is described as residing in the concept of the sequence of reactions including: converting a compound having a 5-phenylpent-1-yne nucleus, ring-unsubstituted in at least one position ortho to the point of chain attachment, by means of a Mannich type reaction, to its acetylenic amine derivative; hydrating the acetylenic linkage to form a 3-keto compound; reacting such 3-keto substrate compound with a nucleophilic 2-monovalent alkyl-1,3-dioxocyclopentano compound under Michael condensation conditions to attach the cyclopentane compound through its 2-position carbon atom to the 1-position carbon atom of the 3-keto compound; treating the bicyclic triketone formed in the preceding step with an acidic dehydrating agent thereby to effect a double cyclodehydration to form a 1,3,5(10),8,14-pentadehydro-13-alkyl gonane; selectively saturating the 14(15) double bond of said gonane with hydrogen in the presence of a catalyst; thereafter saturating the 8(9) double bond of the compound resulting from the preceding step; partially reducing the A-ring double bonds and the 17-carbonyl group to 17-hydroxymethylene; and thereafter converting the so-reduced compound to a 5-dehydro-13-alkyl-17-hydroxygonane.

Figure 2:
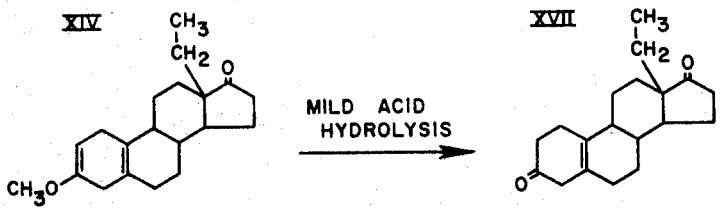
FIGURE 2 illustrates schematically the mild acid hydrolysis of a 13-alkylgona-2,5(10)-diene to a 13-alkylgon-5(10)-ene, specifically 13β-ethyl-3-methoxygona-2,5(10)-dien-17-one to 13β-ethylgon-5(10)-ene-3,17-dione.

The invention sought to be patented in a second process aspect, as illustrated in annexed FIGURE 2, is described as residing in the concept of a reaction comprising hydrolyzing compound with a gona-2,5(10)-diene nucleus, having attached thereto in the 13-position a monovalent polycarbon-alkyl radical (XIV), under mild conditions, i.e. low temperature, weak acid, to obtain a compound with a gon-5(10)-en-3-one nucleus having attached thereto in the 13-position a monovalent polycarbon-alkyl radical (XVII).

Figure 3:
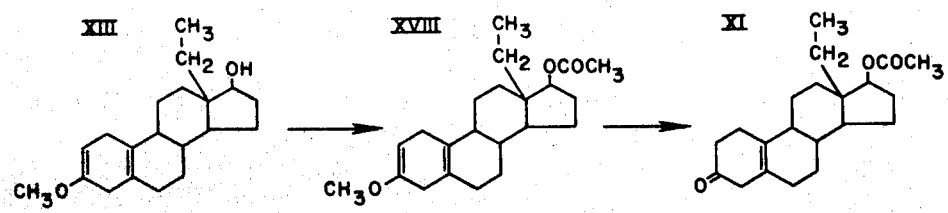
FIGURE 3 illustrates schematically the reaction sequence for preparing an ester of a 13-alkyl-17-hydroxygon-5-ene from a 13-alkylgona-2,5(10)-dien-17-ol, specifically the acetate ester of 13β-ethyl-17β-hydroxygon-5(10)-en-3-one from 13β-ethyl-3-methoxygona-2,5(10)-dien-17β-ol.

The invention sought to be patented in a third process aspect, as illustrated in annexed FIGURE 3, is described as residing in the concept of a sequence of reactions including: esterifying the hydroxy group of a compound with a gona-2,5(10)-dien-17-ol having attached thereto in the 13-position a monovalent polycarbon-alkyl radical (XIII) to obtain a compound with a 17-acyloxygona-2,5(10)-diene nucleus having attached thereto in the 13-position a monovalent polycarbon-alkyl group (XVIII), and hydrolyzing the enol ether group under mild conditions to obtain the corresponding 5(10)-en-3-one (XIX).

Figure 4:
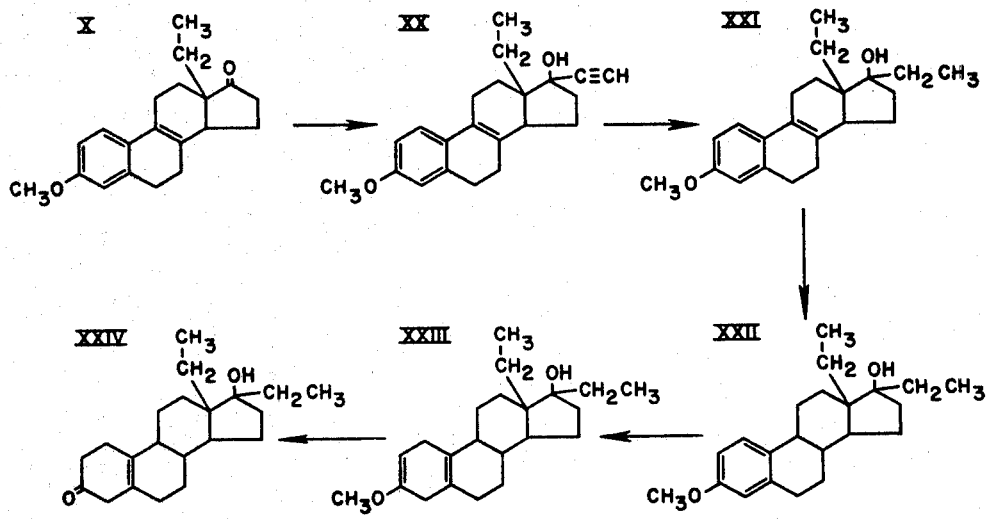
FIGURE 4 illustrates schematically the reaction sequence for preparing a 13β,17α-dialkyl-17β-hydroxygon-5(10)-en-3-one from a 13β-alkylgona-1,3,5(10),8-tetraen-17-one, specifically 13β,17αdiethyl-17β-hydroxygon-5(10)-en-3-one from 13β-ethyl-3-methoxygona-1,3,5(10),8-tetraen-17-one.

The invention sought to be patented in a fourth process aspect, as illustrated in annexed FIGURE 4, is described as residing in the concept of a sequence of reactions including; treating a compound with a gona-1,3,5(10),8-tetraen-17-one nucleus having attached thereto in the 13-position a monovalent polycarbon-alkyl radical with an organometallic derivative of a 1-alkyne to obtain the corresponding 17α - alkynylgona - 1,3,5(10),8-tetraen-17β-ol having attached thereto in the 13-position a monovalent polycarbon-alkyl radical; selectively saturating the alkynyl group with hydrogen in the presence of a catalyst, thereafter saturating the 8(9) double bond of the compound resulting from the previous step; partially reducing the A-ring double bonds; and, thereafter converting the so-reduced compound by mild acid hydrolysis to a 17-alkyl-17-hydroxygon-5(10)-en-3-one having attached thereto in the 13-position a polycarbon-alkyl radical.

The manner of making the chemical compounds, which are the starting materials for use in making the compounds of the invention, and for use in the processes of making the invention, are illustrated in copending application Serial No. 228,384 filed October 4, 1962.

The manner and process of making and using the invention will now be generally described so as to enable a person skilled in the art of chemistry to make and use same, as follows:

Referring now to FIGURE 1, wherein the compounds are assigned Roman numerals for identification schematically, the sequence of reactions involved in the synthesis of a specific embodiment, namely 13β-ethyl-17α-ethynyl-17-hydroxygon-5(10)-en-3-one, is illustrated 3-(m-methoxyphenyl)propanol (I) is heated with phosphorus tribromide in benzene after dropwise addition in the cold to form 3-(m-methoxyphenyl)-propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxan and cuprous chloride at 70° C. for about twelve hours whereby there is obtained 1-diethylamino-6-(m-methoxyphenyl)-3-hexanone (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexen-3-one (VI).

Either the ketamine (V) or the ketone (VI), or mixtures thereof, is then reacted with 2-ethyl-1,3-cyclopentanedione (VII) under Michael condensation conditions, e.g. refluxing in methanolic potassium hydroxide to form 2 - ethyl - 2 - [6-(m-methoxyphenyl)-6-oxohexyl]-1,3-cyclopentanedione (VIII). Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β-ethyl-3-methoxygona-1,3,5(10),8,14-pentaen-17-one (IX). The 14-unsaturation of compound IX is then selectively hydrogenated in the presence of a metal catalyst such as 2% palladized calcium carbonate, to form 13β-ethyl-3-methoxygona-1,3,5(10),8-tetraen-17-one (X). Reduction of Compound X with sodium borohydride in ethanol gives 13β-ethyl-3-methoxygona-1,3,5(10),8-trien-17β-ol (XI), which is then converted to 13β-ethyl - 3 - methoxygona-1,3,5(10)-trien-17β-ol (XII) by alkali metal reduction in liquid ammonia, to provide the normal gonane configuration of 9,8-8,14-14,13 exocyclic substituents, namely trans-anti-trans.

By alkali metal reduction in liquid ammonia in the presence of a proton donor, such as ethanol (Birch reduction), compound XII is converted to 13β-ethyl-3-methoxygona-2,5(10)-dien-17β-ol (XIII). Oppenauer oxidation of compound XIII yields 13β-ethyl-3-methoxygona-2,5(10)-dien-17-one (XIV), which is ethynylated at the 17-position with lithium acetylide in dimethylacetamide to give 13β - ethyl - 17α - ethynyl - 3-methoxygona-2,5(10)-dien-17β-ol (XV). By hydrolyzing under mild conditions such as treatment with aqueous oxalic acid or acetic acid compound XV is then converted to 13β-ethyl-17α-ethynyl-17β-hydroxygon-5(10)-en-3-one (XVI).

This compound, 13β - ethyl - 17α - ethynyl - 17β - hydroxygon-5(10)-en-3-one, exhibits pituitary blocking and progestational activity accompanied by a separation of undesirable hormone effects found in the natural steroids (e.g., minimal estrogenic effects).

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael condensation step is 2-methyl-1,3-cyclopentanedione.

The aromatic ring of the phenylpropanol (FIGURE 1, I) used as starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ort' ɟ position for said subsequent ring closure, a para-directing group (referred to electrophilic aromatic substitution) such as hydroxy, acyloxy, alkoxy, amino, alkylamino, or acylamino is a necessary substituent on the aromatic ring. The group may be present initially or may be introduced later but before ring closure, either directly, or by conversion from a meta-directing group such as nitro.

The term "para-directing group" (referring to electrophilic aromatic substitution) as used herein means an activating group as those hereinbefore listed and which activates all positions on the aromatic nucleus. Thus, if the group is para-directing, as defined above, it can be in a position meta to the ortho position to which ring closure is limited by steric considerations, said position being activated even though another position is more highly actvated. Ring closure could not occur at the said more highly activated position because of the above-mentioned steric limitations.

After the tetracyclic structure has been formed, substituents can be introduced into the aromatic A-ring which are not limited as above; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy, alkylenethioxy, and alkylenedithio; or groups introducible by known processes, such as halogen or alkyl.

For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. The 2-carbon atom of the starting phenyl propanol can also be substituted, as, for example, with an alkyl group, such as methyl and ethyl, and, as such, be unchanged throughout the subsequent synthesis. In the tetracyclic structures of the invention these carbon atoms will appear in the 6 and 7-positions respectively.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent or a 1-hydroxy substituent will react with the nucleophilic compound to form the Michael product. The nucleophilic compound can be a carbocyclic, 1,3-dione of varying ring size, as for example, a five-membered ring, a six-membered ring etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure.

The 1,3-cyclodione may also contain a hetero atom at positions other than position 2, thereby to provide a heterocyclic D-ring in the tetracyclic structure. A cyclic nucleophilic compound can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other. When the nucleophilic compound is 2-methyl-1,3-cyclopentanedione, the invention provides a unique total synthesis for natural steroids; the hydrogens at the 8-position, 9-position, and 14-position being $\beta$, $\alpha$, and $\alpha$, respectively, as in the natural steroids. Thus such valuable therapeutic substances as 19-nortestosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralkyl, cycloalkyl, or a polycarbon-alkylene bridge bearing a hydroxy-, amino-, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbonalkyl substituents, having physiological acticity of the same type.

In any of the intermediate structures or in the tetracyclic structures of the invention wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group; to alkoxymethylene by etherification of the hydroxymethylene group; to alkylhydroxymethylene by addition of the appropriate organometallic reagent to the carbonyl; or to alkynylhydroxymethylene by addition of the appropriate alkali metal acetylide in a suitable inert solvent; all in the known manner. The carbonyl group may also be ketalized or thioketalized by treating with the appropriate alcohol or glycol in a suitable inert solvent under acidic conditions, as in the presence of an acid such as sulfuric acid, p-toluene sulfonic acid, or boron trifluoride etherate, with heating where necessary, according to the known art.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph.

Representative formulations embodying specific compositions of the invention follow.

A pharmaceutical tablet for use as an oral progestational agent consists of the following ingredients:

| | Mg. |
|---|---|
| 13$\beta$ - ethyl - 17$\alpha$-ethynyl-17$\beta$-hydroxygon-5(10)-en-3-one | 5 |
| Carboxymethylcellulose (viscosity 400 cps.) | 15 |
| Lactose powder | 25 |
| Redried corn starch | 25 |
| Magnesium stearate powder | 4 |
| Calcium silicate powder, q.s. | |
| | 200 |

A capsule for use as an oral progestational agent contains, in encapsulating gelatin, the following ingredients:

| | Mg. |
|---|---|
| 13$\beta$ - ethyl - 17$\alpha$-ethynyl-17$\beta$-hydroxygon-5(10)-en-3-one | 5 |
| Finely divided silica lubricant | 5 |
| Magnesium stearate powder | 5 |
| Powdered corn starch | 113 |
| Lactose powder, q.s. | |
| | 245 |

Pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders, or tablet disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired.

The powders and tablets preferably contain from 5 to 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with ciscous material, natural or synthetic gums, resins, etc., for example, gum arabic, ion-exchange resins, methyl cellulose, sodium carboxymethylcellulose and other well-known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged from. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulations including sustained-release agents.

The following preparations illustrate the manner of making the chemical compounds which are the starting materials for use in the processes of the invention.

Preparation 1.—3-(3-methoxyphenyl)-n-propyl bromide

Cool 3-(3-methoxyphenyl)propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hour and then heat at 60° for 3 hours. Cool, pour onto ice, dilute with ether and separate the organic layer. Wash the organic solution with 3 N aqueous sodium hydroxide, water and dry. Remove the solvent and distil the residue to obtain the title compound (131 g.), B.P. 146–148°/17 mm. $n_D^{18}$ 1.5497.

$C_{10}H_{13}BrO$ calculated: C, 52.4; H, 5.7; Br 34.8. Found: C, 54.4; H, 5.7; Br 34.7.

Preparation 2.—5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distil to obtain 5-m-methoxyphenylpent-1-yne (7.1 gr., 66%), B.P. 75–78° C./0.06 mm. Hg.

$C_{12}H_{14}O$ calculated: C, 82.7%; H, 8.1%. Found: C, 82.2%; H, 7.8%.

Preparation 3.—1-diethylamino-6-m-methoxyphenyl-hex-2-yne

Allow 5-m-methoxyphenylpent-1-yne (8 g.) to stand for 12 hours at 70° C. under nitrogen with water (2.5 cc.), trioxan (0.5 g.), 30% formalin (5.5 g.), diethylamine (4 g.), acetic acid 2.75 g.), dioxan (25 cc.) and cuprous chloride (0.13 g.). Make the cooled solution alkaline with 10% aqueous sodium hydroxide and extract with ether; then extract the ether extract with 10% hydrochloric acid: wash the acid extract with ether, make alkaline with 10% aqueous sodium hydroxide, extract with ether, and then wash and dry the ether extract. Distil to obtain 1-diethylamino-6-m-methoxyphenylhex-2-yne (10.6 g., 88%), B.P. 130–131° C./0.1 mm.

$C_{17}H_{25}N$ calculated C, 78.7%; H, 9.7%. Found: C, 78.9%; H, 9.6%.

Preparation 4.—1-Diethylamino-6-m-methoxyphenyl-hexan-3-one and 6-m-methoxyphenylhex-1-en-3-one Add mercuric sulphate (0.45 g.) to a swirled solution of 1-diethylamino - 6 - m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash the ethereal solution. Remove the solvent to obtain the crude ketoamine 1-diethylamino-6-m-methoxyphenylhexan-3-one, infrared absorption peak at 1710μ. Distil under reduced pressure with partial elimination of diethylamine, to obtain a mixture of the ketoamine 1-diethylamino-6-m-methoxyphenylhexan-3-one and the vinyl ketone 6-m-methoxyphenylhex - 1 - en-3-one, (7.1 g., ca. 76%), B.P. 140–145° C./0.1 mm.; infrared absorption peaks at 5.85 and 5.95μ, the ketoamine predominating.

Preparation 5.—2-(6-m-methoxyphenyl-3-oxohexyl) 2-ethylcyclopentane-1,3-dione

Reflux a mixture of (5.25 g.) of 1-diethylamino-6-m-methoxyphenylhexan-3-one and 6-m-methoxyphenylhex-1-en-3-one with 2-ethylcyclopentane-1,3-dione, (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m - methoxyphenyl-3-oxohexyl)-2-ethylcyclopentane-1,3-dione (7.1 g.) as a gum.

Preparation 6.—13β-ethyl-3-methoxygona-1,3,5(10), 8,14-pentaen-17-one

Reflux the triketone 2-ethyl-2-(6-m-methoxyphenyl-3-oxohexyl)-cyclopentane-1,3-dione (7.1 g.), in benzene (150 cc.) and toluene-p-sulphonic acid (2 g.) until the theoretical amount of water (0.72 cc.) for double cyclo-dehydration has been collected in a Dean-Stark separator. Wash the cooled reaction mixture after removal of solvent under reduced pressure, B.P. ca. 220°/0.01 mm., to obtain an almost colorless glass (5.7 g.). Crystallize the glass from methanol containing a little ethyl acetate to obtain pure 13β-ethyl-3-methoxygona-1,3,5-(10),8,14-pentaen-17-one (3.7 g.), M.P. 77–80°; ultraviolet absorption peak at 311 mμ (ε 28,000).

$C_{20}H_{22}O_2$ calculated C, 81.6%; H, 7.5%. Found: C, 81.3%; H, 7.3%.

Preparation 7.—13β-ethyl-3-methoxygona-1,3,5(10),8-tetraen-17-one

Dissolve 13β - ethyl - 3-methoxygona-1,3,5(10),8,14-pentaen-17-one (2 g.) in dioxan (50 cc.) containing Raney nickel (ca. 0.5 g.) of moderate activity and shake with hydrogen until 160 cc., the amount corresponding to one molecular proportion has been absorbed. Recrystallize the isolated product from methanol to obtain the title product (1.2 g.), M.P. 110–115°; ultraviolet absorption peak at 280 mμ (ε 13,200).

Preparation 8.—13β-ethyl-3-methoxygona-1,3,5(10),8-tetraen-17β-ol

Add 13β - ethyl-3-methoxygona-1,3,5(10),8-tetraen-17-one (16.8 g.) to a solution of sodium borohydride (6 g.) in methanol (500 cc.), swirl the mixture which boils spontaneously. When all the material has been added and the reaction has subsided, add acetic acid (15 cc.). Reduce the mixture in volume by evaporation of most of the solvent, add water and extract the product with ether. Evaporate the washed and dried extracts to obtain crude crystalline product (16.8 g.), M.P. 102–105° on recrystallization from acetonitrile.

Preparation 9.—13β-ethyl-3-methoxygona-1,3,5(10)-trien-17β-ol

To 13β - ethyl - 3-methoxygona-1,3,5(10),8-tetraen-17β-ol (16.8 g.) dissolved in a mixture of aniline (150 cc.) and tetrahydrofuran (50 cc.) add liquid ammonia (400 cc.). Add lithium metal (6.0 g.) gradually in small pieces during 10 minutes, and stir the blue suspension obtained. After 2 hours, add ammonium chloride (50 g.) to the reaction mixture until a clear solution is obtained; then add water (600 cc.) and ether-extract the mixture. Evaporate the washed and dried extracts to obtain as residue a crystalline solid. Recrystallize from hexane (300 cc.), to obtain 13β-ethyl-3-methoxygona-1,3,5(10)-trien-17β-ol (14 g.), M.P. 126–130°.

Preparation 10.—13β-ethyl-3-methoxygona-2,5(10)-dien-17β-ol

Add 13β - ethyl - 3 - methoxygona-1,3,5(10)-trien-17β-ol (0.5 g.) in tetrahydrofuran (50 cc.) to stirred liquid ammonia (150 cc.), followed by lithium foil (0.5 g.) and then add ethanol (6 cc.) during 20 minutes. When the blue color is discharged, add water and work up the product with ether, to yield 13β-ethyl-3-methoxygona-2,5(10)-dien-17β-ol as a solid (0.47 g.).

Preparation 11.—13β-ethyl-3-methoxygona-2,5(10)-dien-17-one

Reflux a mixture of 13β-ethyl-3-methoxygona-2,5(10)-dien-17β-ol (0.8 g.) aluminium isopropoxide (0.36 g.), toluene (26 cc.) and cyclohexanone (8 cc.) under nitrogen for 3 hours. Allow the solution to cool under nitrogen, add water (5 cc.) and shake the mixture vigorously. Add anhydrous sodium sulphate (5 g.), shake the mixture again, and then allow to stand for 30 minutes. Filter the solution, combine the filtrate with ether-washings of the residue, and evaporate, first at 30°/20 mm., then at 50°/0.1 mm. to leave as a crystalline solid 13β-ethyl - 3-methoxygona-2,5(10)-dien-17-one; infrared absorption peaks at 5.78, 5.92, 6.01μ, with no absorption due to hydroxyl.

Preparation 12.—13β-ethyl-3-methoxy-17α-ethynyl-gona-2,5(10)-dien-17β-ol

Add a suspension of lithium aluminium acetylide (obtained by passing excess acetylene through a solution of lithium aluminium hydride (2.0 g.) in tetrahydrofuran (25 cc.) with stirring to 13β - ethyl-3-methoxygona-2,5(10)-dien-17-one (0.6 g.) in tetrahydrofuran (5 cc.). After standing for 18 hours, add ether (40 cc.), followed by the careful dropwise addition of water until effervescence ceases. Add anhydrous mangesium sulphate (10 g.) and filter the solution and evaporate the filtrate under reduced pressure to give 13β - ethyl-3-methoxy-17α-ethynyl-gona-2,5(10)-dien-17β-ol (90.6 g.).

Infrared absorption peaks at 2.80, 3.05, 4.59, 6.00μ.

The following examples illustrate the manner of using the claimed processes of the invention for the preparation of the claimed compositions of the invention.

Example 1.—13β-methyl-17aβ-hydroxy-D-homogon-5(10)-en-3-one

Add 13β - methyl - 3 - methoxy-D-homogona-2,5(10)-dien-17aβ-ol (4 g.) to a solution of oxalic acid dihydrate (5 g.) in water (70 cc.) and methanol (200 cc.) in an atmosphere of nitrogen. Add isopropanol (40 cc.) and stir the mixture for 1½ hours. Filter the reaction mixture, pour the filtrate into brine and extract with ether. Wash, dry and evaporate the ethereal solution and recrystallize the residue from ethyl acetate to give 13β-methyl - 17aβ - hydroxy - D - homogon-5(10)-en-3-one (1.85 g.), M.P. 105–110°. Infrared absorption peaks at 2.98, 5.85μ.

This compound has estrogenic activity and is useful as an intermediate for preparing the hormonal compounds of this invention.

To prepare 13β - ethyl - 2-methoxy-17β-hydroxygon-5(10) - en - 3-one treat 13β-ethyl-2,3-dimethoxygona-2,5(10)-dien-17β-ol with oxalic acid dinydrate according to the manipulative procedure described above.

To prepare 13β - ethyl - 1 - oxo-17β-hydroxygon-3-one treat 13β - ethyl - 1,3-dimethoxygona - 1,5(10)-dien-17β-ol with oxalic acid dihydrate according to the manipulative procedure described above.

To prepare 13β - phenethyl - 17β - hydroxygon-5(10)-en - 3 - one treat 13β-phenethyl-3-methoxygona-2,5(10)-dien-17β-ol with oxalic acid dihydrate according to the manipulative procedure described above.

To prepare 13β - (3 - hydroxypropyl)-17β-hydroxygon-5(10) - en - 3 - one treat 13β-(3-hydroxypropyl)-3-methoxygona-2,5(10)-dien-17β-ol with oxalic acid dihydrate according to the manipulative procedure described above.

To prepare 13β-(13-dimethylaminopropyl)-1-oxo-17β-hydroxygonan-3-one treat 13β-(3-dimethylaminopropyl)-1,3-dimethoxygona-1(10),3-dien-17β-ol with oxalic acid dihydrate according to the manipulative procedure described above.

These compounds have estrogenic activity and are useful as intermediates in the preparation of the hormonal compounds of the invention.

Example 2.—13β-ethyl-17aβ-hydroxy-D-homogon-5(10)-en-3-one

Hydrolyze 13β-ethyl-3-methoxy-D-homogona-2,5(10)-dien-17aβ-ol (5 g.) by the method of the preceding example to obtain 13β-ethyl-17aβ-hydroxy - D - homogon-5(10)-en-3-one (3.3 g.), M.P. 110–115° C.; infrared absorption peaks at 2.85, 5.82μ.

This compound has estrogenic activity and is useful as an intermediate for preparing the hormonal compounds of this invention.

Example 3.—13β-methyl-17β-hydroxygon-5(10)-en-3-one

Add a slurry of 13β-methyl-3-methoxygona-2,5(10)-dien-17β-ol (27.9 g.) in dioxane (50 cc.) with stirring to a mixture of methanol (2000 cc.) and water (390 cc.) containing oxalic acid dihydrate (37 g.) at room temperature and continue stirring until 10 minutes after a clear solution had been obtained. Add water (5000 cc.) and extract the product with benzene (1 vol.)-ether (1 vol.). Work up in the usual manner and recrystallize the residue from ethyl acetate to give 13β-methyl-17β-hydroxygon-5(10)-en-3-one (18.8 g.), M.P. 144–148° C.

$C_{19}H_{28}O_2$ calculated: C, 79.1; H, 9.8%. Found: C, 79.6; H, 9.6%.

Infrared absorption peaks at 2.93, 5.86μ; no ultraviolet absorption in the 200–300 mμ region.

This compound has estrogenic activity and is useful as an intermediate for preparing the hormonal compounds of this invention.

Example 4.—13β-ethyl-17β-hydroxygon-5(10)-en-3-one

Stir 13β-ethyl-3-methoxygona-2,5(10) - dien - 17β - ol (0.35 g.) with a mixture of methanol (30 cc.), water (6 cc.) and oxalic acid dihydrate (0.46 g.) at room temperature for 45 minutes. Add water and extract the solution with ether. Wash the ethereal solution with water, saturated aqueous sodium bicarbonate and brine, dry and evaporate. Recrystallize the residue from ethyl acetate to give 13β-ethyl-17β-hydroxygon-5(10) - en - 3 - one, M.P. 147–9°; infrared absorption peaks at 2.93, 5.86μ.

This compound has estrogenic activity and is useful as an intermediate for preparing the hormonal compounds of this invention.

Example 5.—13β-ethyl-17β-hydroxygon-5(10)-en-3-one

Hydrolyze 13β-ethyl-3-n-propoxygona-2,5(10) - dien - 17β-ol (0.35 g.) exactly as described in the previous example to give 13β-ethyl-17β-hydroxygon-5(10)-en-3-one, M.P. 147–9°.

This compound has estrogenic activity and is useful as an intermediate for preparing the hormonal compounds of this invention.

Example 6.—13β-n-propyl-17β-hydroxygon-5(10)-en-3-one

Stir 13β-n-propyl-3-methoxygona-2,5(10)-dien-17β -ol (0.350 g.) with a mixture of methanol (30 cc.), water (6 cc.) and oxalic acid dihydrate (0.46 g.) at room temperature and under nitrogen for 50 min. A clear solution forms after 30 minutes' stirring. Work up the product by means of ether and repeatedly crystallize from ethyl acetate to yield 13β-n-propyl-17β-hydroxygon-5(10)-en-3-one; M.P. 127–30°; infrared absorption peaks at 2.89, 5.85μ.

$C_{20}H_{30}O_2$ calculated: C, 79.4%; H, 10.0%. Found: C, 79.3%; H, 10.0%.

This compound has estrogenic activity and is useful as an intermediate for preparing the hormonal compounds of this invention.

Example 7.—13β-n-butyl-17β-hydroxygon-5(10)-en-3-one

Stir 13β-n-butyl-3-methoxygona-2,5(10)-dien - 17β - ol (4.6 g.) under nitrogen in methanol (354 cc.) containing water (59 cc.) and oxalic acid dihydrate (5.85 g.) for 45 minutes at room temperature. Filter, add water (885 cc.) and extract the mixture with ether-benzene. Evaporate the washed and dried extracts and recrystallize the residue from ether to give 13β-n-butyl-17β-hydroxygon-5(10)-en-3-one, M.P. 104–107°; infrared absorption peak at 5.86μ.

This compound has estrogenic activity and is useful as an intermediate for preparing the hormonal compounds of this invention.

Example 8.—13β-isopropyl-17β-hydroxygon-5(10)-en - 3-one

Add 13β-isopropyl-3-methoxygona-2,5(10)-dien - 17β-ol (0.09 g.) in ethanol (10 cc.) to a solution of oxalic acid dihydrate (0.2 g.) in water (3 cc.). Keep the mixture at 25° for 40 minutes and then add an excess of saturated aqueous sodium bicarbonate solution. Isolate the product with ether and crystallize by cooling and rubbing with ether to give 13β-isopropyl-17β-hydroxygon-5(10)-en-3-one (0.064 g.) M.P. 60–65°; infrared absorption peak at 5.85μ.

This compound has estrogenic activity and is useful as an intermediate for preparing the hormonal compounds of this invention.

Example 9.—13β-isobutyl-17β-hydroxygon - 5(10) - en-3-one

To a solution of 13β-isobutyl-3-methoxygona-2,5(10)-dien-17β-ol (1.0 g.) in methanol (91 cc.) add oxalic acid dihydrate (1.39 g.) in water (18.1 cc.). Stir the mixture for 2 hours at room temperature, add water and extract with ether. Wash the ethereal extracts with sodium bicarbonate solution and water, dry and evaporate to dryness under reduced pressure to give a gum (0.6 g.). Crystallize the gum from ethyl acetate and thereafter from cyclohexane to furnish analytically pure 13β-isobutyl-17β-hydroxygon-5(10)-en-3-one, M.P. 133–135°; infrared absorption peaks at 2.92, 5.85μ.

$C_{21}H_{32}O_2$ calculated: C, 79.7%; H, 10.1%. Found: C, 80.0%; H, 10.2%.

This compound has estrogenic activity and is useful as an intermediate for preparing the hormonal compounds of this invention.

Example 10.—13β-ethylgon-5(10)-ene-3,17-dione

Add 13β-ethyl-3-methoxygona-2,5(10) - dien - 17 - one (1.3 g.) with stirring in a slurry in dioxane (6 cc.) to methanol (100 cc.) containing oxalic acid dihydrate (1.9 g.) and water (20 cc.). Continue for 10 minutes after a clear solution is obtained. Add water (500 cc.) and collect the product with ether.

Recrystallize the product from ethyl acetate-ether to obtain 13β-ethylgon-5(10)-en-3,17-dione (9 g.), M.P. 120–126° C. To obtain an analytical specimen recrystallize from the same solvent mixture to M.P. 127–128° C.; infrared absorption peaks at 5.76, 5.85μ; no selective ultraviolet absorption in the 200–300μ region.

$C_{19}H_{26}O_2$ calculated: C, 79.7%; H, 9.15%. Found: C, 79.9%; H, 9.15%.

This compound has estrogenic activity and is useful as an intermediate for preparing the hormonal compounds of this invention.

Example 11.—13β-methyl-17aα-ethylnyl-17aβ-hydroxy-D-homogon-5(10)-en-3-one

Add 13β - methyl-3-methoxy-17aα-ethylnyl-D-homogona-2,5(10)-dien-17aβ-ol (0.3 g.) in dioxane (10 cc.) with stirring to methanol (20 cc.) containing oxalic acid dihydrate (0.46 g.) and water (6 cc.). Continue stirring for 2 hours, add water and extract the mixture with ether. Dissolve the product in benzene and chromatograph on Florex to give the title compound; infrared absorption peaks at 2.99, 3.09, 5.86μ.

This compound has estrogenic activity and is useful as an intermediate for preparing the hormonal compounds of this invention.

To prepare 13β-isopropyl-17α-ethyl-17β-hydroxygon-5 (10)-en-3-one treat 13β-isopropyl-17α-ethyl-3-methoxygona-2,5(10)-dien-17β-ol with oxalic acid dihydrate according to the manipulative procedure described above.

To prepare 13β-isobutyl-17α-methyl-17β-hydroxygon-5 (10)-en-3-one treat 13β-isobutyl-17α-methyl-3-methoxygona-2,5(10)-dien-17β-ol with oxalic acid dihydrate according to the manipulative procedure described above.

To prepare 13β,17α-dimethyl-17β-hydroxygon-5(10)-en-3-one treat 13β,17α-dimethyl - 3 - methoxygona-2,5(10)-dien-17β-ol with oxalic acid dihydrate according to the manipulative procedure described above.

To prepare 13β,17α-diethyl-2-methoxy-17β-hydroxygon 5(10)-en-3-one treat 13β,17α-diethyl-2,3-dimethoxygona-2,5(10)-dien-17β-ol with oxalic acid dihydrate according to the manipulative procedure described above.

To prepare 13β,17α-diethyl-1-oxo-17β-hydroxygon-3-one treat 13β,17α-diethyl-1,3-dimethoxygona-1,3(10)-dien-17β-ol with oxalic acid dihydrate according to the manipulative procedure described above.

To prepare 13β-phenethyl-17α-ethyl-17β-hydroxygon-5 (10)-en-3-one treat 13β-phenethyl-17α-ethyl-3-methoxygona-2,5(10)-dien-17β-ol with oxalic acid dihydrate according to the manipulative procedure described above.

To prepare 13β-(3-hydroxypropyl)-17α-methyl-17β-hydroxygon-5(10)-en-3-one treat 13β-(3-hydroxypropyl)-17α-methyl-3-methoxygona-2,5(10)-dien-17β-ol with oxalic acid dihydrate according to the manipulative procedure described above.

To prepare 13β-(3-dimethylaminopropyl)-17α-ethyl-17β - hydroxy-1-methoxygon-5(10)-en-3-one treat 13β-(3 - dimethylaminopropyl)-17α-ethyl-3-methoxygona-2,5 (10)-dien-17β-ol with oxalic acid dihydrate according to the manipulative procedure described above.

These compounds have estrogenic activity and are useful as intermediates for preparing the hormonal compounds of this invention.

Example 12.—13β-methyl-17aα-ethynyl-17aβ-hydroxy-D-homogon-5(10)-en-3-one

Add 13β-methyl-3-methoxy-17aα-ethynyl-D-homogona-2,5(10)-dien-17aβ-ol (3 g.) in dioxane (10 cc.) with stirring to methanol (20 cc.) containing oxalic acid dihydrate (0.45 g.) and water (6 cc.). After stirring for 2 hours, add water and extract the mixture with ether. Evaporate the washed and dried extracts to obtain the title compound; infrared absorption peaks at 2.93, 5.90μ.

This compound has estrogenic and progestational activity and is useful as an intermediate fo preparing the hormonal compounds of this invention.

Example 13.—13β-ethyl-17aα-ethynyl-17aβ-hydroxy-D-homogon-5(10)-en-3-one

Stir 13β-ethyl-3-methoxy-17aα-ethynyl-D-homogona-2,5 (10)-dien-17aβ-ol (4 g.) with oxalic acid dihydrate (4.5 g.) in water (35 cc.) and methanol (250 cc.) for 30 minutes. Pour the mixture into brine and extract with ether. Evaporate the washed and dried ether extract to dryness and recrystallize the residue from ethyl acetate to obtain the title compound (1.75 g.), M.P. 164–168° C; infrared absorption peaks at 2.92, 3.06, 5.84μ.

This compound has estrogenic activity and is useful as an intermediate for preparing the hormonal compounds of this invention.

Example 14.—13β,17aα-diethyl-17aβ-hydroxy-D-homogon-5(10)-3-one

Stir 13β,17aα-diethyl-3-methoxy-D-homogona-2,5(10)-dien-17aβ-ol (4 g.) with oxalic acid dihydrate (4.5 g.) in water (35 cc.) and methanol (250 cc.) for 2 hours. Pour the filtered solution into brine and extract with ether. Evaporate the washed and dried extracts and recrystallize the residue from ether to obtain the title compound (2.5 g.), M.P. 116–123° C.

This compound has estrogenic activity and is useful as an intermediate for preparing the hormonal compounds of this invention.

Example 15.—13β-ethyl-17α-ethynyl-17β-hydroxygon-5(10)-en-3-one

Add 13β - ethyl-3-methoxy-17α-ethynylgona-2,5(10)-dien-17β-ol (9.6 g.) in methanol (30 cc.) to a solution of oxalic acid dihydrate (0.45 g.) in water (6 cc.). After standing at room temperature for 45 minutes, add ether (60 cc.) and wash, dry, and evaporate the ether solution. Dissolve the residual gum in benzene (5 cc.) and chromatograph on an activated fuller's earth (50 g.); elute with light petroleum containing first a small and then a gradually increasing proportion of benzene to obtain first a crystalline byproduct, followed by the desired title compound. Recrystallize from a mixture of light petroleum and ethyl acetate, to yield the pure compound (0.15 g.), M.P. 169–173°; infrared absorption peaks at 2.99, 5.86μ.

This compound has progestational activity and is useful as an intermediate for preparing the hormonal compounds of this invention.

Example 16.—13β-17α-diethyl-17β-hydroxygon-5(10)-en-3-one

Stir 13β,17α-diethyl-3-methoxygona-2,5(10)-dien-17β-ol (5 g.) in methanol (430 cc.) containing water (87 cc.) and oxalic acid dihydrate (6.6 g.) until the solid has completely dissolved. Isolate the product (4.55 g.), M.P. 126–134° C. by means of ether and recrystallize repeatedly from ethyl acetate to obtain the title compound; M.P. 142–143° C.; infrared absorption peaks at 2.90, 5.85μ.

$C_{21}H_{32}O_2$ calculated: C, 79.9%; H, 10.2%. Found: C, 79.6%; H, 10.1%.

This compound has progestational activity and is useful as an intermediate for preparing the hormonal compounds of this invention.

Example 17.—13β-ethyl-17α-propynyl-17β-hydroxygon-5(10)-en-3-one

Suspend 13β - ethyl - 3 - methoxy-17α-propynylgona-2,5(10)-dien-17β-ol (4 g.) in methanol (200 cc.) and water (20 cc.). Add oxalic acid (4 g.) followed by dioxane (100 cc.) and stir the mixture until dissolution is complete and then for a further 20 minutes. Add water and filter the precipitated product, wash with water and dry. Crystallize from an ethyl acetate-hexane mixture to obtain the title compound, M.P. 156–159° C.; infrared absorption peaks at 4.55, 5.83μ; no selective ultraviolet absorption beyond 220 mμ.

This compound has estrogenic activity and is useful as an intermediate for preparing the hormonal compounds of this invention.

Example 18.—13β-ethyl-17α-(2-propenyl)-17β-hydroxygon-5(10)-en-3-one

Suspend 13β - ethyl-3-methoxy-17α-(2-propenyl)-gona-2,5(10)-dien-17β-ol (1.5 g.) in methanol (50 cc.) and water (5 cc.). Add oxalic acid (1 g.) followed by dioxane (20 cc.), and stir the mixture until dissolution is complete and then for a further 20 minutes. Add water gradually and filter the precipitated material, wash with water and dry. Recrystallize from an ethyl acetate-hexane mixture to obtain the title compound (1 g.); infrared absorption peaks at 2.94, 6.21, 6.10μ; no selective ultraviolet absorption beyond 220 mμ.

This compound has estrogenic activity and is useful as an intermediate for preparing the hormonal compounds of this invention.

Example 19.—13β-ethyl-17α-(2-isobutenyl)-17β-hydroxygon-5(10)-en-3-one

Suspend 13β-ethyl-3-methoxy-17α-(2-isobutenyl)-gona-2,5(10)-dien-17β-ol in methanol (50 cc.) and water (5 cc.). Add oxalic acid (1 g.) followed by dioxane (20 cc.), and stir the mixture until dissolution is complete and then for a further 30 minutes. Add water and extract the product with ether. Wash, dry, and evaporate the ethereal solution and recrystallize the residue from ethyl acetate-hexane to obtain the title compound; infrared absorption peaks at 2.90, 5.85, 6.10, 11.5μ; no selective ultraviolet absorption beyond 220 mμ.

This compound has estrogenic activity and is useful as an intermediate for preparing the hormonal compounds of this invention.

Example 20.—13β-n-propyl-17α-methyl-17β-hydroxygon-5(10)-en-3-one

To 13β - n-propyl-3-methoxy-17α-methylgona-2,5(10)-dien-17β-ol (0.3 g.) in methanol (30 cc.) add a solution of oxalic acid dihydrate (0.46 g.) in water (6 cc.). After stirring at room temperature for 20 minutes, add isopropanol (30 cc.) and continue stirring for 80 minutes; work up the product with ether and recrystallize from a mixture of ether and hexane to obtain the title compound (0.2 g.), M.P. 158–163° C.; infrared absorption peak at 5.90μ; no selective ultraviolet absorption beyond 220 mμ.

This compound has estrogenic activity and is useful as an intermediate for preparing the hormonal compounds of this invention.

Example 21.—13β-n-propyl-17α-ethynyl-17β-hydroxygon-5(10)-en-3-one

To 13β - n-propyl-3-methoxy-17α-ethynylgona-2,5(10)-dien-17β-ol (0.24 g.) in methanol (40 cc.) add a solution of oxalic acid dihydrate (0.58 g.) in water (7.6 cc.) and stir the mixture for 90 minutes at room temperature under nitrogen. Add water, work up the product with ether and purify the residue obtained by chromatography on fuller's earth. Crystallize from cyclohexane and then from ethyl acetate to obtain the title compound (0.037), M.P. 182–190° C.; infrared absorption peaks at 2.90, 3.08, 5.84μ.

$C_{22}H_{30}O_2$ calculated: C, 80.9%; H. 9.3%. Found: C, 80.5%; H, 8.6%.

This compound has estrogenic activity and is useful as an intermediate for preparing the hormonal compounds of this invention.

Example 22.—13β-n-propyl-17β-hydroxy-17α-propynylgon-5(10)-en-3-one

Stir 13β - n - propyl - 3 - methoxy-17α-propynylgona-2,5(10)-diene-17β-ol (2.5 g.) for 2 hours in methanol (80 cc.) containing water (10 cc.) oxalic acid dihydrate (1.75 g.) and tetrahydrofuran (60 cc.). Add the mixture to brine and extract the product with ether. Evaporate the washed and dried extracts and recrystallize the residue from ethyl acetate-hexane to afford the title compound, M.P. 147–150° C.

$C_{23}H_{32}O_2$ calculated: C, 81.1%; H, 9.5%. Found: C, 80.8%; H. 9.4%.

This compound has estrogenic activity and is useful as an intermediate for preparing the hormonal compounds of this invention.

Example 23.—13β-n-butyl-17α-ethynyl-17β-hydroxygon-5(10)-en-3-one

Stir 13β - n - butyl-17α-ethynyl-3-methoxygona-2,5(10)-diene-17β-ol (2 g.) in methanol (50 cc.) containing oxalic acid dihydrate (0.9 g.) and water (12 cc.) under nitrogen for 2 hours. Pour the mixture into water and extract with ether. Evaporate the washed and dried extracts to a residue, purify by chromatography on Florex and recrystallize from ethyl acetate-hexane to give 13β-n-butyl-17α-ethynyl-17β-hydroxygon-5(10)-en-3-one (750 mg.), M.P. 160–164° C.; infrared absorption peaks at 2.87, 3.08, 5.82μ.

This compound has estrogenic activity and is useful as an intermediate for preparing the hormonal compounds of this invention.

Example 24.—13β-ethyl-17,17-ethylenedioxygon-5(10)-en-3-one

Add 13β-ethyl-3-methoxy-17,17-ethylenedioxygona-2,5(10)-diene (11 g.) in dioxane (45 cc.) with stirring to oxalic acid dihydrate (12 g.) in methanol (900 cc.) containing water (150 cc.). Stir the mixture for 1 hour and work up. Purify the resulting gum by chromatography on Florex and recrystallize from ethyl acetate-hexane to yield 13β-ethyl-17,17-ethylenedioxygon-5(10)-en-3-one (2 g.), M.P. 117–123° C.; infrared absorption peaks at 5.80, 9.22, 9.57, 10.8μ.

This compound is useful as an intermediate for preparing the hormonal compounds of this invention.

Example 25.—17α-chloroethynyl-17-hydroxy-13β-propylgon-5(10)-en-3-one

Dissolve 3 - methoxy - 13β-propylgona-2,5(10)-dien-17-one (8 g.) in ether (250 ml.) and treat with chloroethynyl lithium prepared from 100 ml. of methyl lithium (5.53%, 0.35 M) and cis-dichloroethylene (0.175 M) in ether. Stir the reaction mixture for 20 hours under nitrogen and work up to obtain 8 g. of a gum (about 50% reaction). Treat with hot methanol (225 ml.) and chill mixture to obtain 17-(chloroethynyl)-3-methoxy-13β-propylgona-2,5(10)-dien-17β-ol (2.5 g.). Hydrolyze 17-(chloroethynyl)-3-methoxy - 13β - propylgona-2,5(10)-dien-17β-ol (1 g.) with oxalic acid. 2H₂O 1 g., water (10 ml.), and methanol (50 ml.). Let reaction mixture stand for 2 hours. Dilute reaction mixture with water and isolate the product with ether. Chromatograph on silica gel to obtain title compound (350 mg.), M.P. 174–176° C. (Found: C, 73.46; H, 8.37. $C_{22}H_{29}O_2Cl$ requires: C, 73.21; H, 8.10%.)

This compound has estrogenic activity and is useful as an intermediate for preparing the hormonal compounds of this invention.

Example 26.—13β-ethyl-17β-(2-hydroxyethoxy)gon-5(10)-en-3-one

Add an ethereal solution of lithium aluminum hydride (15 ml. of a 1 M solution) to aluminum chloride 13.3 g. in ether (100 ml.) and stir for 20 min. Add to a cool solution of 13β-ethyl-3-methoxygona-1,3,5(10)-trien-17-one, cyclic ethylene ketal (17.1 g.) in ether (1000 ml.) and stir the mixture for 4 hours, keeping the reaction mixture cool in an ice-water bath. Dilute with 2 N sulphuric acid until a clear solution results. Separate the ether layer, wash with saturated sodium bicarbonate solution, dry and evaporate. Treat the residue with ethanol (200 ml.), concentrated hydrochloric acid (5 ml.) and water (10 ml.) on a steam bath for 30 min. Evaporate, then recrystallize from ethanol to obtain 13β-ethyl-3-methoxy - 17β - (2 - hydroxyethoxy)gona - 1,3,5(10)-triene (8.1 g.), M.P. 131–132°.

Dissolve 13β-ethyl-3-methoxy-17β-(2 - hydroxyethoxy)gona-1,3,5(10)-triene (4.0 g.) in 60 ml. of 1-methoxy-2-propanol, 120 ml. of tetrahydrofuran, and 300 ml. of liquid ammonia. Add lithium (4.0 g.) gradually, while stirring, during the course of 1 hr. Add 8.0 g. of ammonium chloride and water. Filter the resulting precipitate, wash with water, and dry. Dissolve the product in 300 ml. of tetrahydrofuran and 300 ml. of liquid ammonia and treat with 4.0 g. of lithium. Stir for 1 hr. Add absolute alcohol, followed by water. Filter the resulting precipitate and wash with water. Suspend 1.7 g. in methanol (100 ml.), water (20 ml.), and oxalic acid (2.0 g.). Stir under nitrogen for 2 hr. Add water and separate the product with ether. Wash the organic layer with a saturated sodium bicarbonate solution and dry over magnesium sulfate. Evaporate the ether to obtain the title compound as a gum; infrared maxima at 2.95, 5.85μ. (Found: C, 75.26; H, 9.83. $C_{21}H_{32}O_3$ requires: C, 75.86; H, 9.70%.)

This compound has estrogenic activity and is useful as an intermediate for preparing the hormonal compounds of this invention.

Example 27.—17α-chloroethynyl-13β-ethyl-17-hydroxygon-5(10)-en-3-one

Prepare lithium chloroacetylide by treating lithium methyl (5.33 g.) in ether (100 cc.) with cis-1,2-dichloroethylene (16.9 g.) in an atmosphere of nitrogen and add 13β-ethyl-3-methoxygona-2,5(10)-dien - 17 - one. Stir the mixture for 48 hours at 25°, pour into water and isolate with ether. Triturate the solid product with hot methanol and filter the cooled mixture to obtain 17α-chloroethynyl-13β-ethyl-3-methoxygona-2,5(10)-dien - 17β - ol (4.5 g.). Stir this compound (2.7 g.) in dioxan (30 cc.) with a solution of oxalic acid (3.3 g.) in methanol (200 cc.)-water (40 cc.). Add more dioxan (30 cc.) and stir for one hour in an atmosphere of nitrogen. Filter the reaction mixture and dilute the filtrate with water (2 l.). Filter the product, dissolve it in ether and wash the ethereal solution with brine and dry with sodium sulphate. Evaporate and crystallize the oily residue from ether-hexane to obtain the title compound (1.7 g.), M.P. 110–114°.

This compound has estrogenic activity and is useful as an intermediate for preparing the hormonal compounds of this invention.

Example 28.—13β-ethylgon-5(10)-ene-3,17β-diol

Dissolve 13β-ethyl-17β-hydroxygon-5(10)-en-3-one (10 g.) in tetrahydrofuran (250 ml.) and treat with lithium tritertiarybutoxy aluminum hydride (12 g.). After 16 hr., add water (20 ml.), and filter the precipitate. To the filtrate, add ether-benzene, wash, dry, and evaporate. Recrystallize the crude product from ethanol to obtain the title compound, M.P. 146–148°. (Found: C, 77.5; H, 10.4. $C_{19}H_{30}O_2$ requires: C, 77.5; H, 10.36%.)

This compound has estrogenic activity and is useful as an intermediate for preparing the hormonal compounds of this invention.

Example 29.—13β-ethylgon-5(10)-ene-3,17β-diol, diacetate

Dissolve 13β-ethylgon-5(10)-ene-3,17β - diol (10 g.) in acetic anhydride (50 ml.) and pyridine (50 ml.) and allow the mixture to stand for 16 hr. Remove the solvents under reduced pressure. Dissolve the residue in ether-benzene. Wash, dry, and evaporate. Recrystallize the residue from hexane to obtain the title compound (10 g.), M.P. 127–129°. (Found: C, 73.87; H, 9.11. $C_{23}H_{34}O_4$ requires: C, 73.76; H, 9.15%.)

This compound has estrogenic activity and is useful as an intermediate for preparing the hormonal compounds of this invention.

Example 30.—17β-ethoxy-13β-propylgon-5(10)-en-9-one

Reflux 3-methoxy-13β - propylgona-1,3,5(10)-trien-17β-ol (5 g.) with sodium hydride (3.93 g., 50% in oil) in xylene (100 ml.) for 1 hour. Add ethyl iodide (14.3 ml.), reflux for 3 hours, and then allow to stand at 25° for 16 hours. Add water and 2 N hydrochloric acid to pH 1, separate the organic layer and extract the aqueous with ether. Wash, dry, and evaporate the combined organic solution and recrystallize the residue from methanol to give 17β-ethoxy-3-methoxy-13β-propylgona-1,3,5(10)-triene (2.9 g.), M.P. 119–121°. Dissolve the product (2.2 g.) in 1-methoxypropan-2-ol (60 ml.) and tetrahydrofuran (110 ml.) and stir with liquid ammonia (190 ml.). Add lithium (2.2 g.) and when the blue color is discharged, add water and extract with ether. Wash, dry, and evaporate the ethereal extracts to give 17β-ethoxy-3-methoxy-13β-propylgona-2,5(10)-diene as a solid.

Combine 17β-ethoxy-3-methoxy-13β-propylgona-2,5(10)-diene (1.7 g.) with oxalic acid (1.7 g.) in water (25 ml.) and methanol (170 ml.). Stir the mixture under nitrogen for 1.5 hr. Filter off the small amount of residue, add water to the filtrate, and extract with ether. Wash the ether with bicarbonate and water, and dry over magnesium sulfate. Evaporate the solvent on a rotary evaporator, leaving 2.7 g. of residue. Dissolve in 25 ml. of hot methanol, reduce the volume, cool in a Dry Ice-acetone bath, filter, and dry in vacuo over diphosphorus pentoxide to obtain the title compound (500 mg.), M.P. 110–115°.

This compound has estrogenic activity and is useful as an intermediate for preparing the hormonal compounds of this invention.

Example 31.—17α-(chloroethynyl)-13β-ethyl-17-hydroxy-D-homogon-5(10)-en-3-one

Add methyl lithium (94.6 g., .218 mole) in diethyl ether and dilute with ether (200 ml.). Cool to 0°. Add cis-dichloroethylene (11.0 g., .109 mole) over one hour. Suspend 13β-ethyl-D-homo-3-methoxygona-2,5(10)-dien-17a-one (12.0 g.) in ether (250 ml.) and add to the reaction mixture. Stir at room temperature. Cool the reaction in an ice bath and add saturated aqueous ammonium chloride (250 ml.) dropwise. Separate the ether layer and wash with water until neutral. Dry, remove the solvent, and triturate the crystalline residue with boiling methanol (100 ml.). Dissolve 2.5 g. in tetrahydrofuran (20 ml.), and add to methanol (80 ml.) containing water (10 ml.) and (COOH)₂.H₂O (1.75 g.). Add tetrahydrofuran (20 ml.) and stir under nitrogen for 45 min. to effect solution. Pour the reaction mixture into brine, extract with ether, wash the ether layer, dry, and evaporate. Recrystallize the residue to obtain the title compound (1.40 g.), M.P. 150–154°; infrared maxima (potassium bromide) at 2.87, 4.53, 5.84μ.

This compound has estrogenic activity and is useful as an intermediate for preparing the hormonal compounds of this invention.

Example 32.—13β-ethyl-17,17-ethylenedioxy-3,3-dimethoxygon-5(10)-ene

Cool 13β-ethyl-17,17-ethylenedioxy-3-methoxygona-2,5(10)-diene (3 g.) in methanol (60 cc.) and ether (45 cc.) to 5°, add toluene-p-sulfonic acid (50 mg.) and stir the suspension for 1 hour, when the solid will gradually dissolve and then reprecipitate. Add 5% aqueous sodium hydroxide and collect the product with ether-benzene. Wash, dry and evaporate the organic solution, and recrystallize from hexane-ether containing a trace of pyridine to obtain the title compound (2.6 g.), M.P. 115–117°.

Example 33.—13β-ethyl-17β-acetoxy-3-methoxygona-2,5(10)-diene

Dissolve 13β-ethyl-3-methoxygona-2,5(10)-diene-17β-ol (1.0 g.) in pyridine (6 cc.) and acetic anhydride (2 cc.) and stir the mixture at 25° for 24 hours. Add ether and wash with 5% aqueous sodium carbonate, water and dry. Remove the solvent under reduced pressure and recrystallize the residue from ether to obtain the title compound (0.65 g.), M.P. 143–146°; infrared absorption peaks at 5.77, 5.9, 6.0μ.

Example 34.—13β-ethyl-17β-acetoxygon-5(10)-en-3-one

Stir 13β-ethyl-17β-acetoxy-3-methoxygona-2,5(10)-diene (0.65 g.) in methanol (30 cc.) with oxalic acid (0.5 g.) in water (7 cc.) at 25° for 90 minutes. Add ether (150 cc.) and wash with aqueous sodium bicarbonate, water and dry. Evaporate the solvent and crystallize the residue from methanol to obtain the title compound (0.53 g.), M.P. 100–112°; infrared absorption peaks at 5.76, 5.85μ.

The subject matter which the applicants regard as their invention is particularly pointed out and distinctly claimed as follows:

1. A chemical compound having the structure

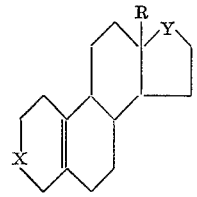

wherein
R is an alkyl group containing from 2 to 16 carbon atoms;
X is keto, hydroxymethylene, or group convertible thereto by hydrolysis;
Y is keto, or

or group convertible thereto by hydrolysis and R' is hydrogen, alkyl, alkenyl, alkynyl, or haloalkynyl.

2. A compound according to claim 1 having the 13-polycarbon-alkyl-17-alkynyl-17-hydroxygon-5(10)-en-3-one structure.
3. The compound according to claim 1, 13β-ethyl-17β-hydroxygon-5(10)-en-3-one.
4. The compound according to claim 1, 13β-n-propyl-17β-hydroxygon-5(10)-en-3-one.
5. The compound according to claim 2, 13β-ethyl-17α-ethynyl-17β-hydroxygon-5(10)-en-3-one.
6. The compound according to claim 1, 13β-17α-diethyl-17β-hydroxygen-5(10)-ene-3-one.
7. The compound according to claim 2, 13β-n-propyl-17α-ethynyl-17β-hydroxygon-5(10)-en-3-one.
8. The compound according to claim 2, 17α-chloroethynyl-17-hydroxy-13β-n-propylgon-5(10)-en-3-one.
9. The compound according to claim 2, 17α-chloroethynyl-13β-ethyl-17-hydroxygon-5(10)-en-3-one.
10. The compound according to claim 2, 13β-ethyl-17α-propynyl-17β-hydroxygon-5(10)-en-3-one.
11. The compound according to claim 1, 13β-ethylgon-5(10)-ene-3,17-dione.

References Cited

UNITED STATES PATENTS

| 2,729,654 | 1/1956 | Colton | 260—397.4 |
| 2,905,676 | 9/1959 | Colton | 260—397.4 |

OTHER REFERENCES

Applezweig, Steroid Drugs, vol. 1, p. 441 and 442, McGraw-Hill, New York.

Applezweig, Steroid Drugs, vol. 2, p. 123.

HENRY FRENCH, *Primary Examiner.*